Figure 1:
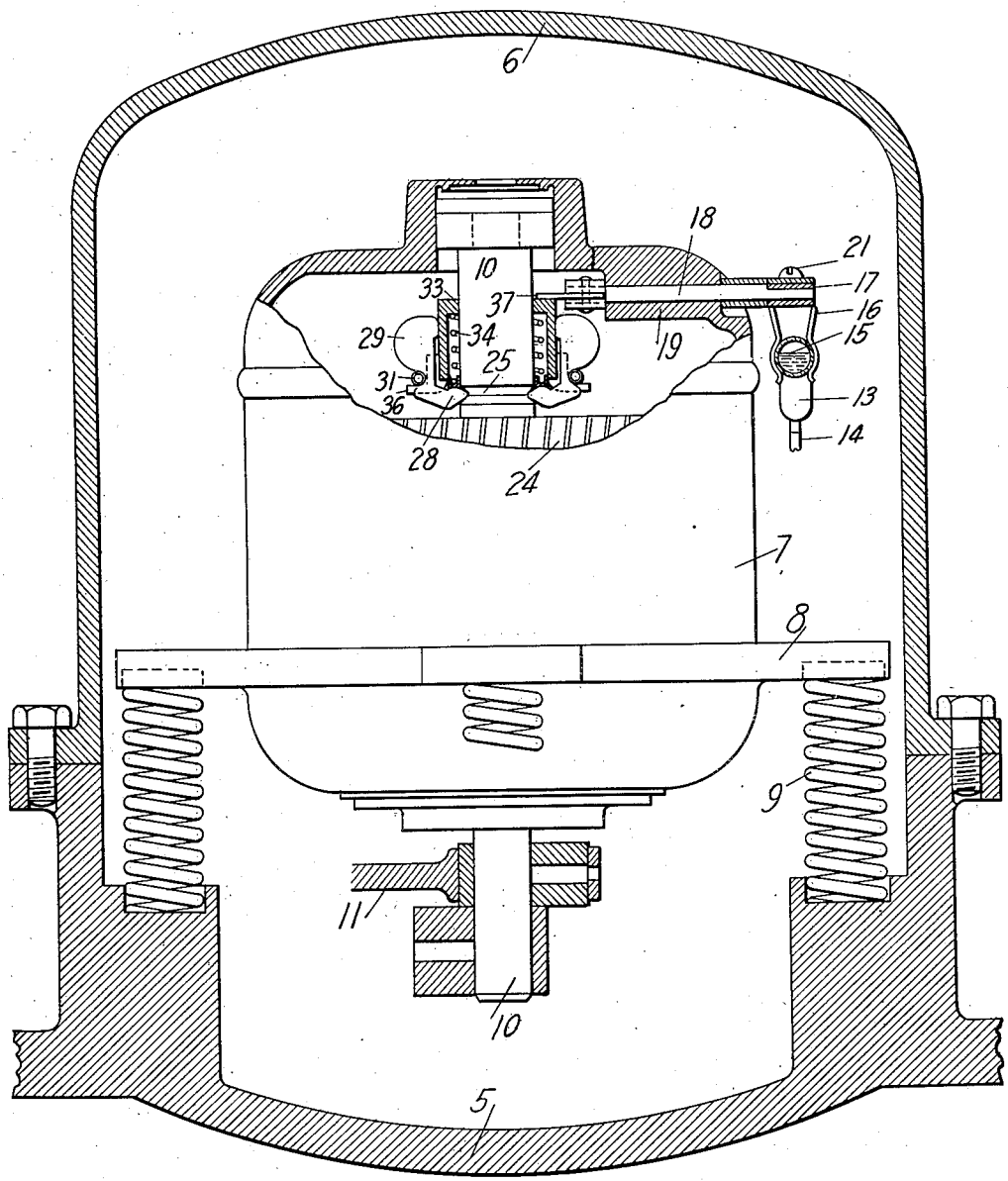

INVENTOR.
GEORGE H. LELAND
his ATTORNEY.

May 9, 1933.  G. H. LELAND  1,907,985
CONTROLLING DEVICE FOR ELECTRIC MOTORS
Filed May 29, 1930    2 Sheets-Sheet 2
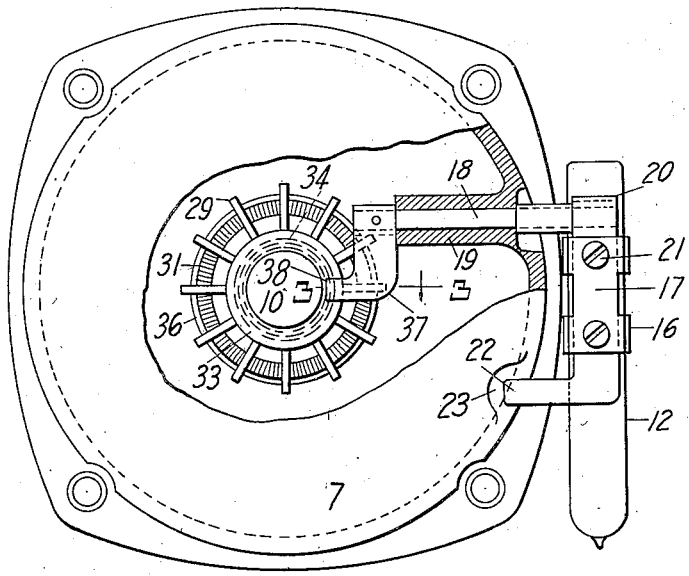
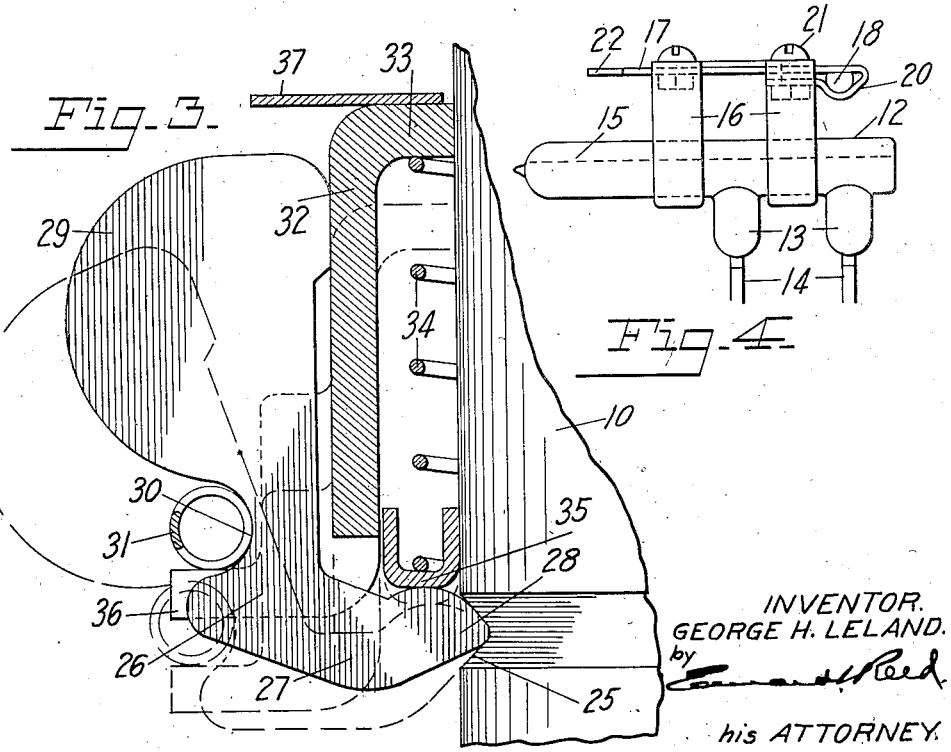
INVENTOR.
GEORGE H. LELAND.
by
his ATTORNEY.

Patented May 9, 1933

1,907,985

UNITED STATES PATENT OFFICE

GEORGE H. LELAND, OF DAYTON, OHIO, ASSIGNOR OF ONE-HALF TO THE LELAND ELECTRIC COMPANY, OF DAYTON, OHIO, A CORPORATION OF OHIO

CONTROLLING DEVICE FOR ELECTRIC MOTORS

Application filed May 29, 1930. Serial No. 457,479.

This invention relates to an electric motor and more particularly to a device for automatically controlling the starting circuit of a split phase motor.

One object of the invention is to provide a simple efficient device for automatically breaking the starting circuit after the motor has gained speed.

Split phase motors are usually provided with means for interrupting the starting circuit after the motor has reached its normal speed of operation. In some installations, more particularly in domestic refrigerating machines, motors of this type are utilized for operating gas compressors and in order that there may be no leakage of the gas into the refrigerator or into the room in which the mechanism is located it is desirable that the motor and the compressor be enclosed in a sealed chamber. In such an installation a switch having exposed contacts is highly objectionable because of the injurious action of the spark, which occurs when the switch is operated, on the gas and, further, because there is often danger of an explosion due to the spark. It is therefore a further object of the invention to provide the starting circuit of such a motor with a switch of the enclosed type, that is, a switch in which the contact points and the connecting medium are enclosed within a sealed chamber, and to provide means controlled in accordance with the speed at which the motor operates to actuate the switch.

A further object of the invention is to provide such a device in which the switch will be located exteriorly of the motor casing but will be controlled by a speed controlled mechanism arranged within the motor casing and operatively connected with the motor shaft.

Other objects of the invention will appear as the mechanism is described in detail.

In the accompanying drawings Fig. 1 is a sectional view of an apparatus embodying my invention, showing the motor casing partly in elevation; Fig. 2 is a top plan view of the motor with the top of the casing partly broken away; Fig. 3 is a detail view of a portion of the centrifugally operated device; and Fig. 4 is a detail view of the mercury tube switch.

In these drawings I have illustrated one embodiment of my invention and have shown the same as applied to a split phase motor mounted in a sealed chamber but it will be understood that the invention may take various forms and may be used for various purposes.

In the particular embodiment here illustrated the motor is mounted in an upright position, that is, on a vertical axis, in a sealed chamber formed within a container having a base portion 5 and an upper removable portion 6. In the present instance, the motor casing 7 is provided with a flange 8 which is supported on the base 5, coiled springs 9 being interposed between the flange and the base to provide a cushioned support for the motor. The lower end of the armature shaft 10 projects below the motor casing and has connected thereto suitable means, such as a pitman 11, for connecting the motor with a compressor, which is not here shown.

Mounted adjacent to the motor, within the container 6, is a switch for controlling the starting circuit for the motor, which is of the split phase type. This switch is preferably of the enclosed type and is here shown as a mercury tube switch, but it will be understood that the term "mercury tube switch" is herein employed to indicate any switch of the general type in which the contact points or electrodes are arranged within a sealed chamber and connected or disconnected by a more or less fluid medium arranged within the chamber and movable from one position to the other when the chamber is tilted. In the present construction the switch comprises an elongated tube 12 having near one end thereof depressions or wells 13 in which the contact points or electrodes are arranged, each well being provided with a nipple 14 by means of which the electrode therein may be connected with a flexible conductor, this conductor having sufficient slack to permit of the tilting movement of the switch. Each of the wells 13 is filled with mercury and within the body of the tube 12 is a body of mercury 15 sufficient to bridge both wells, and thus close the circuit, when the tube is in a substantially horizontal position but which, when the tube is tilted, will move out of contact with the mercury in one or both of the wells and thus break the circuit. The tube is mounted for tilting movement and in the form here shown is carried by clips 16 which are rigidly secured to a bracket or arm 17 which in turn is mounted on and movable with a substantially horizontal shaft 18 which is journaled in a bearing 19 near the top of the motor casing 7. The bracket may be secured to the shaft in any desired manner and, as here shown, one end of the bracket or arm is bent upon itself, as shown at 20, to provide a clamp which may be drawn tightly about the end of the shaft 18 by the screw 21. One side of the shaft is flattened, as shown, to hold the bracket against rotation with relation thereto. It will be noted that the shaft or pivotal point for the switch is arranged above that end of the tube 12 which is provided with the wells 13, so that when the shaft is unrestrained the bracket and tube will move by gravity to an inclined position, thus causing the mercury to flow to the lower end of the tube and break the circuit. The bracket is provided with a finger 22 arranged to engage a shoulder 23 on the motor casing and limit the tilting movement of the tube. The inner end of the shaft 18 extends into the motor casing and is there connected with a speed controlled device which in turn controls the movement of the shaft about its longitudinal axis.

The speed controlled device may take various forms and, in the present construction, I have shown the same in the form of a centrifugally operated device mounted on the armature shaft. The upper portion of the armature shaft, within the motor casing but above the armature 24, is provided with a circumferential groove 25 which is preferably V-shaped. Arranged about the shaft are a series of centrifugally operated weights 26 each of which is substantially L-shape in form. The lower or transverse arm 27 of each weight has its inner end tapered, as shown at 28, and extending into the groove in the armature shaft. The upper arm of each weight, which extends lengthwise of the shaft, is enlarged or weighted, as shown at 29, and is provided in its outer edge, adjacent to the lower arm 27, with a recess to receive a contractile band or annular spring 31 which encircles the several weights and serves to hold the parts 28 thereof in the groove and to resist the movement of the weights about the point of contact of the part 28 with the shaft, the base of the groove in the shaft forming a fulcrum point for each weight. Mounted about the shaft 10 is a collar or housing 32 having at its upper end an inwardly extending portion or flange 33 which is slidably mounted on the shaft. A spring 34 is coiled about the shaft within the housing and is confined between the upper portion or flange 33 of the housing and a second collar 35 slidably mounted on the shaft, and resting upon the upper edges of the arms 27 of the several weights. Preferably the collar 35 is U-shaped in cross section to receive the spring. The housing has as its lower end an outwardly extending flange 36 which is arranged beneath the contractile band 31. When the motor is idle or running at low speed the contractile band 31 will hold the several weights in their upright positions and in contact with the housing and the spring 34 will hold the housing 32 in its elevated position. As the motor gains speed the centrifugal force exerted upon the weights will throw the same outwardly against the action of the contractile band 31, the weights moving about their points of contact with the shaft. Consequently the contractile band 31 will not only be expanded but will be moved downwardly and will act on the flange 36 of the housing to move that housing downwardly, the parts moving to the position shown in dotted lines in Fig. 3. When the motor slows down or stops the action of the contractile band and spring 34 will return the weights to their upright positions and the spring 34 will return the housing to its elevated position. It will be noted that the contractile band or spring 31 has three functions. First, it holds the tapered ends 28 of the arms 27 of the weights in the groove 25; second, it resists the outward movement of the weights under centrifugal force, and, third, it serves to connect the weights with the sliding collar or housing 32 and thus controls the position of that collar according to the position of the weights.

The housing 32 is so connected with the shaft 18 that it will control the position of that shaft and of the mercury tube switch. In the present construction an arm 37 is rigidly secured to the inner end of the shaft 18 and has a finger 38 which overlaps and rests upon the upper portion or flange 33 of the housing or collar 32. When the collar or housing is in its uppermost position the shaft will be held in such a position as to support the mercury tube switch substantially horizontal and thus close the starting circuit. When the weights move outwardly and draw the housing or collar 32 downwardly the shaft 18 will be permitted to rotate and the mercury tube switch and its bracket will move by gravity about the axis of the shaft to a tilted position, which will result in the breaking of the starting circuit.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device of the character described, a shaft, a plurality of centrifugally operated weights arranged about said shaft and each having a part pivotally supported on said shaft and a second part extending lengthwise of said shaft, a contractile band extending about said weights to resist the outward movements thereof, and a collar slidably mounted on said shaft and having a part to be engaged by said contractile band when the weights move outwardly to move said collar lengthwise of said shaft, said collar also having means for operatively connecting the same with a part to be operated.

2. In a device of the character described, a shaft, a plurality of centrifugally operated weights arranged about said shaft and each having a part pivotally supported on said shaft and a second part extending lengthwise of said shaft, a contractile band extending about said weights to resist the outward movements thereof, and a collar slidably mounted on said shaft and having means for operatively connecting the same with a part to be operated, a second collar supported by the first mentioned parts of said weights, and a spring confined between said collars, the first mentioned collar having means to cause it to be moved against the action of said spring by the outward movement of said weights.

3. In a device of the character described, a shaft having a circumferential groove, a plurality of centrifugally operated weights arranged about said shaft and each having a part fulcrumed in said groove and a second part extending lengthwise of said shaft, a contractile band extending about said weights to retain said parts thereof in said groove and to resist the outward movement of said weights, a collar slidably mounted on said shaft, having means to cause the same to be moved in one direction by the outward movement of said weights and having means to operatively connect the same with a part to be actuated, and a spring to move said collar in the other direction.

4. In a device of the character described, a shaft having a circumferential groove, a plurality of centrifugally operated weights arranged about said shaft and each having a part fulcrumed in said groove and a second part extending lengthwise of said shaft, the last mentioned parts of said weights having recesses in the outer edges thereof, a contractile band seated in said recesses to retain the first mentioned parts of said weights in said groove and to resist the outward movement of said weights, a collar slidably mounted on said shaft and having means for operatively connected the same with a part to be operated, and a spring to move said collar in one direction, said collar also having a part to be engaged by said contractile band and move said collar against the action of said spring when said weights are moved outwardly.

5. In a device of the character described, a part to be operated, an actuating member operatively connected with said part, a rotatable shaft, a collar slidably mounted on said shaft, means for operatively connecting said collar with said actuating member, a plurality of weights fulcrumed on said shaft, and a contractile band extending about said weights to resist their outward movement and so arranged that it will be moved axially of said shaft by the outward movement of said weights, said collar having a part arranged to be engaged by said contractile band and impart axial movement to said collar.

6. In a device of the character described, a rotatable shaft having a circumferential groove, a plurality of centrifugally operated weights arranged about said shaft and each having a part seated in said groove for pivotal movement and having a second part extending lengthwise of said shaft, a contractile band engaging said weights to retain said parts thereof in said groove and to resist the outward movement of said weights, a collar slidably mounted on said shaft and having means to cause the same to be moved in one direction by the outward movement of said weights, a spring to move said collar in the other direction, a part to be operated, and means controlled by said collar to control the movement of said part.

7. In a device of the character described, a rotatable shaft having a circumferential groove, a plurality of substantially L-shaped weights arranged about said shaft, each of said weights having one arm pivotally seated in said groove and having its other arm extending lengthwise of said shaft, a contractile band acting on said weights to retain the same in said groove and to resist the outward movement thereof, a collar slidably mounted on said shaft and having a part extending outwardly in engagement with said contractile band, whereby the outward movement of said weights will impart axial movement to said collar, a spring acting on said collar to restore the same to its initial position when said weights move inwardly, a second shaft, a part secured to one end of said second shaft, and engaging said collar to impart movement to said second shaft, and a member connected with said shaft for movement thereby.

8. In a device of the character described, a shaft, a plurality of centrifugally operated weights arranged about said shaft and each having a part pivotally supported on said shaft and a second part extending lengthwise of said shaft, a contractile band extending about said weights to resist the outward movements thereof and so arranged that it will be moved axially of said shaft by the outward movements of said weights, a collar slidably mounted on said shaft and having means for operatively connecting the same with a part to be operated, and means actuated by the axial movement of said contractile band to impart movement to said collar.

9. In a device of the character described, a plurality of centrifugally operated weights arranged about said shaft and each having a part pivotally supported on said shaft and a second part extending lengthwise of said shaft, a contractile band extending about said weights to resist the outward movements thereof, a collar slidably mounted on said shaft and having means to cause it to be moved lengthwise of the shaft in one direction by the outward movement of said weights, said collar also having means for operatively connecting the same with a part to be operated, and a spring confined between the first mentioned parts of said weights and said collar to move said collar in the other direction.

In testimony whereof, I affix my signature hereto.

GEORGE H. LELAND.